(12) United States Patent
Chang et al.

(10) Patent No.: US 9,730,013 B2
(45) Date of Patent: Aug. 8, 2017

(54) METHOD, RECORDING MEDIUM AND ELECTRONIC DEVICE OF 3D GEOLOCATION

(71) Applicants: Hsiao-Tse Chang, Taipei (TW); Ta-Gang Chiou, Taipei (TW)

(72) Inventors: Hsiao-Tse Chang, Taipei (TW); Ta-Gang Chiou, Taipei (TW)

(*) Notice: Subject to any disclaimer, the term of this patent is extended or adjusted under 35 U.S.C. 154(b) by 22 days.

(21) Appl. No.: 14/529,169

(22) Filed: Oct. 31, 2014

(65) Prior Publication Data

US 2016/0127864 A1    May 5, 2016

(51) Int. Cl.
*H04W 24/00* (2009.01)
*H04W 4/02* (2009.01)
*H04W 24/10* (2009.01)
*H04W 16/22* (2009.01)
*G01S 5/02* (2010.01)

(52) U.S. Cl.
CPC ............. *H04W 4/021* (2013.01); *G01S 5/02* (2013.01); *G01S 5/0268* (2013.01); *G01S 5/0284* (2013.01); *H04W 4/023* (2013.01); *H04W 16/225* (2013.01); *H04W 24/10* (2013.01)

(58) Field of Classification Search
CPC ... H04W 4/021; H04W 4/023; H04W 16/225; H04W 24/10; H04W 64/00; H04W 4/02; H04L 29/08657; G01S 5/0252; G01S 5/02
USPC ............ 455/456.1, 456, 404.2, 414.2, 67.12, 455/115.2, 115.4, 226.2, 226.1; 707/918, 707/919, 724; 340/8.1
See application file for complete search history.

(56) References Cited

U.S. PATENT DOCUMENTS

| | | | | |
|---|---|---|---|---|
| 5,652,592 | A * | 7/1997 | Sanderford | G01C 5/06 342/120 |
| 8,736,442 | B2 * | 5/2014 | Zazula | G06Q 10/109 340/539.13 |
| 2004/0203856 | A1 * | 10/2004 | Wigren et al. | H04W 64/00 455/456.1 |
| 2005/0140548 | A1 * | 6/2005 | Spirito | G01S 5/02 342/462 |
| 2011/0176523 | A1 * | 7/2011 | Huang | G01S 5/02 370/338 |
| 2011/0177831 | A1 * | 7/2011 | Huang | G06F 17/3087 455/457 |
| 2011/0200023 | A1 * | 8/2011 | Murray | G01S 5/02 370/338 |
| 2012/0026993 | A1 * | 2/2012 | Radpour | H04W 4/021 370/338 |
| 2012/0149388 | A1 * | 6/2012 | West et al. | H04W 24/00 455/456.1 |

(Continued)

*Primary Examiner* — Kathy Wang-Hurst
*Assistant Examiner* — B. M. M Hannan
(74) *Attorney, Agent, or Firm* — Jianq Chyun IP Office

(57) ABSTRACT

A method, a recording medium and an electronic device of 3D geolocation are provided. The method includes the following steps: distributing a plurality of samples that are already 2D-geolocated into a plurality of geographic areas according to 2D locations of the samples, wherein each sample includes a measurement report provided by a user equipment attached to a mobile network; generating a relative sequence of altitudes of the samples in each geographic area according to altitude-related data obtained from the samples in the geographic area; and determining the altitudes of the samples in each geographic area according to the relative sequence of the geographic area.

15 Claims, 3 Drawing Sheets

(56) References Cited

U.S. PATENT DOCUMENTS

| | | | |
|---|---|---|---|
| 2012/0309408 A1* | 12/2012 | Marti et al. | H04W 24/00 455/456.1 |
| 2012/0309428 A1* | 12/2012 | Marti | G01S 5/0278 455/456.5 |
| 2013/0288692 A1* | 10/2013 | Dupray | H04W 64/00 455/450 |
| 2014/0274151 A1* | 9/2014 | Pattabiraman | H04W 4/043 455/456.3 |
| 2015/0163634 A1* | 6/2015 | Meredith | H04W 4/023 455/456.6 |
| 2015/0249907 A1* | 9/2015 | Gupta | H04W 4/043 455/456.1 |
| 2016/0037305 A1* | 2/2016 | Pan | G01S 5/0252 455/456.1 |
| 2016/0192157 A1* | 6/2016 | Wirola | G01S 5/0252 455/456.1 |

* cited by examiner

METHOD, RECORDING MEDIUM AND ELECTRONIC DEVICE OF 3D GEOLOCATION

BACKGROUND OF THE INVENTION

Field of the Invention

The present invention relates to a method, a recording medium and an electronic device of geolocation. More particularly, the present invention relates to a method, a recording medium and an electronic device of 3D geolocation.

Description of the Related Art

Geolocation utilizing mobile network RAN (radio access network) signaling is getting more and more attention from telecom mobile operators. By utilizing geolocation results of all the subscribers in the network, monitored 24 by 7, it can save a lot of human time, effort and cost to optimize and troubleshoot the network problems by traditional drive test method. Furthermore, traditional drive test can only cover a certain area (public roads/streets) and a certain time period while running drive test. It is usually difficult to duplicate the exact same problems the subscribers encounter.

For 2G mobile networks such as GSM (Global System for Mobile Communications) and CDMA (code division multiple access), 3G mobile networks such as UMTS (Universal Mobile Telecommunications System), CDMA2000 and TD-CDMA (time-division-code division multiple access), 4G mobile networks such as LTE (Long Term Evolution) and WiMAX (Worldwide Interoperability for Microwave Access), and coming 5G mobile networks, 3GPP (The 3rd Generation Partnership Project) defines the series of signaling protocol specifications for the communication between user equipment, base station (cell site) and core network. By utilizing the signaling messages, there are many well-known 2D-geolocation methods such as trilaterization, triangulation, multilateration and also many fine-tune proprietary patents for 2D-geolocation. However, in modern cities, there are more and more tricky RF (radio frequency) problems caused by high buildings. Knowing the latitude and longitude is not enough anymore and 3D-geolocation is still a big challenge.

Even in traditional GPS (Global Positioning System) geolocation, 3D-geolocation accuracy is not good either. For example, the accuracy in GPS latitude and longitude could be as good as several meters up to 20 meters error. However, the accuracy in GPS vertical dimension could be up to hundreds of meters error. If the similar approach is applied to telecom mobile network, the traditional GPS positioning method is not so practical because of two reasons. The first reason is that the accuracy in vertical dimension is too sensitive and dozens of meters could already lead to 10 floors error which is not acceptable. The second reason is that, unlike GPS satellites measurement, usually a user equipment in a mobile network can hardly measure 4 or more cell sites. The best practice average is that less than 5% of the calls can measure 4 or more sites. The valid 3D geolocation samples are too few because of the limited number of measured cell sites.

SUMMARY OF THE INVENTION

Accordingly, the present invention is directed to a method, a recording medium and an electronic device of 3D geolocation that are capable of accurately geolocating the vertical dimension of subscribers in a telecom mobile network.

According to an embodiment of the present invention, a method of 3D geolocation is provided. The method includes the following steps: distributing a plurality of samples that are already 2D-geolocated into a plurality of geographic areas according to 2D locations of the samples, wherein each sample includes a measurement report provided by a user equipment attached to a mobile network; generating a relative sequence of altitudes of the samples in each geographic area according to altitude-related data obtained from the samples in the geographic area; and determining the altitudes of the samples in each geographic area according to the relative sequence of the geographic area.

According to another embodiment of the present invention, a recording medium storing a computer program is provided. An electronic device executes the aforementioned method when the electronic device loads and executes the computer program.

According to another embodiment of the present invention, an electronic device of 3D geolocation is provided. The electronic device includes a storage and a processor coupled to the storage. The storage stores a plurality of samples that are already 2D-geolocated. Each sample includes a measurement report provided by a user equipment attached to a mobile network. The processor distributes the samples into a plurality of geographic areas according to 2D locations of the samples. The processor generates a relative sequence of altitudes of the samples in each geographic area according to altitude-related data obtained from the samples in the geographic area. The processor determines the altitudes of the samples in each geographic area according to the relative sequence of the geographic area.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
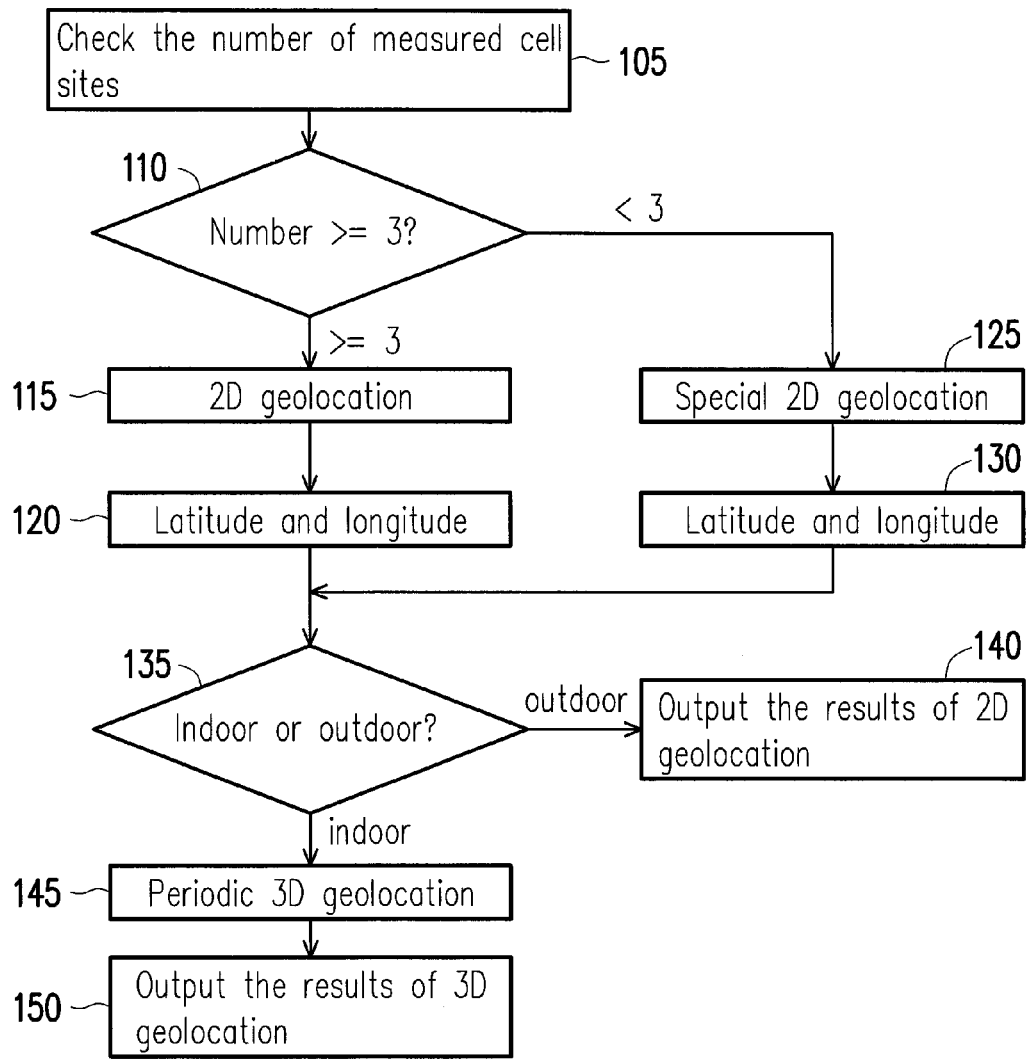
FIG. 1 and FIG. 2 are flow charts showing a method of 3D geolocation according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a flow chart showing a method of 3D geolocation according to an embodiment of the present invention. The method may be executed by an electronic device connected to a mobile network, such as a computer or a server. Before executing the method, the electronic device receives a plurality of samples from the mobile network. Each sample is provided by a user equipment (UE) attached to the mobile network. Each sample includes a measurement report generated by the corresponding user equipment. A user equipment generates measurement reports in certain circumstances. For example, a user equipment may measure the signal strength and the signal quality of nearby cell sites and then send a sample including the resultant measurement report to the network when the user equipment determines that the signal quality of the serving cell is poor. The measurement report includes some data useful for both 2D and 3D geolocation, such as the cell sites measured by the user equipment, the signal strength of each measured cell site, the signal quality of each measured cell site, and timing information such as Tm offset in 3G mobile networks.

The term "measurement report" is an official term in the specifications of 2G, 3G and 4G. The corresponding term in the upcoming 5G standard is not determined yet. For simplicity of description, the term "measurement report" in the following discussions includes the corresponding term in the upcoming 5G standard and the future standards.

When the electronic device executing the method of 3D geolocation is connected to a 2G mobile network, the samples are forwarded by the Base Station Controllers (BSC) of the 2G mobile network to the electronic device. When the electronic device executing the method of 3D geolocation is connected to a 3G mobile network, the samples are forwarded by the Radio Network Controllers (RNC) of the 3G mobile network to the electronic device. When the electronic device executing the method of 3D geolocation is connected to a 4G mobile network, the samples are forwarded by the Evolved Nodes B (eNB) of the 4G mobile network to the electronic device.

The steps of the method of 3D geolocation shown in FIG. 1 are explained below. In step 105, for each sample, check the number of cell sites measured by the user equipment that provides the sample. In step 110, check whether the number of measured cell sites is larger than or equal to 3.

If the number of measured cell sites of the sample is larger than or equal to 3, perform standard 2D geolocation on the sample in step 115. As a result, the latitude and longitude are derived from the sample in step 120. The 2D geolocation may be performed based on network topology provided by the operator of the mobile network. The network topology includes useful information such as the locations, altitudes, and transmitting signal strength of the cell sites of the mobile network. There are many well-known 2D geolocation methods such as trilateration and triangulation. Therefore the details of the standard 2D geolocation are omitted here.

If the number of measured cell sites of the sample is smaller than 3, perform special 2D geolocation on the sample in step 125. As a result, the latitude and longitude are derived from the sample in step 130. There are some conventional special get-around methods for deriving 2D geolocation results under limited measurements. Therefore the details of the special 2D geolocation are omitted here.

Next, determine whether the sample is measured indoors or outdoors in step 135. There are some conventional algorithms capable of this indoor/outdoor determination. Therefore the details are omitted here. If the sample is determined as an outdoor sample, just output the results of the aforementioned 2D geolocation, namely, the latitude and longitude of the sample, in step 140. The altitude of the outdoor sample may be set as 0 or the altitude of sea level depending on the coordinate system used. If the sample is determined as an indoor sample, the flow proceeds to step 145.

In step 145, perform 3D geolocation on the indoor samples that are already 2D-geolocated in step 115 or step 125. The 3D geolocation may be performed periodically such that there are a large enough number of indoor samples for the 3D geolocation. The details of the 3D geolocation are explained in the embodiment corresponding to FIG. 2. Next, output the results of the 3D geolocation, namely, the latitudes, longitudes and altitudes of the indoor samples, in step 150.

Figure 2:
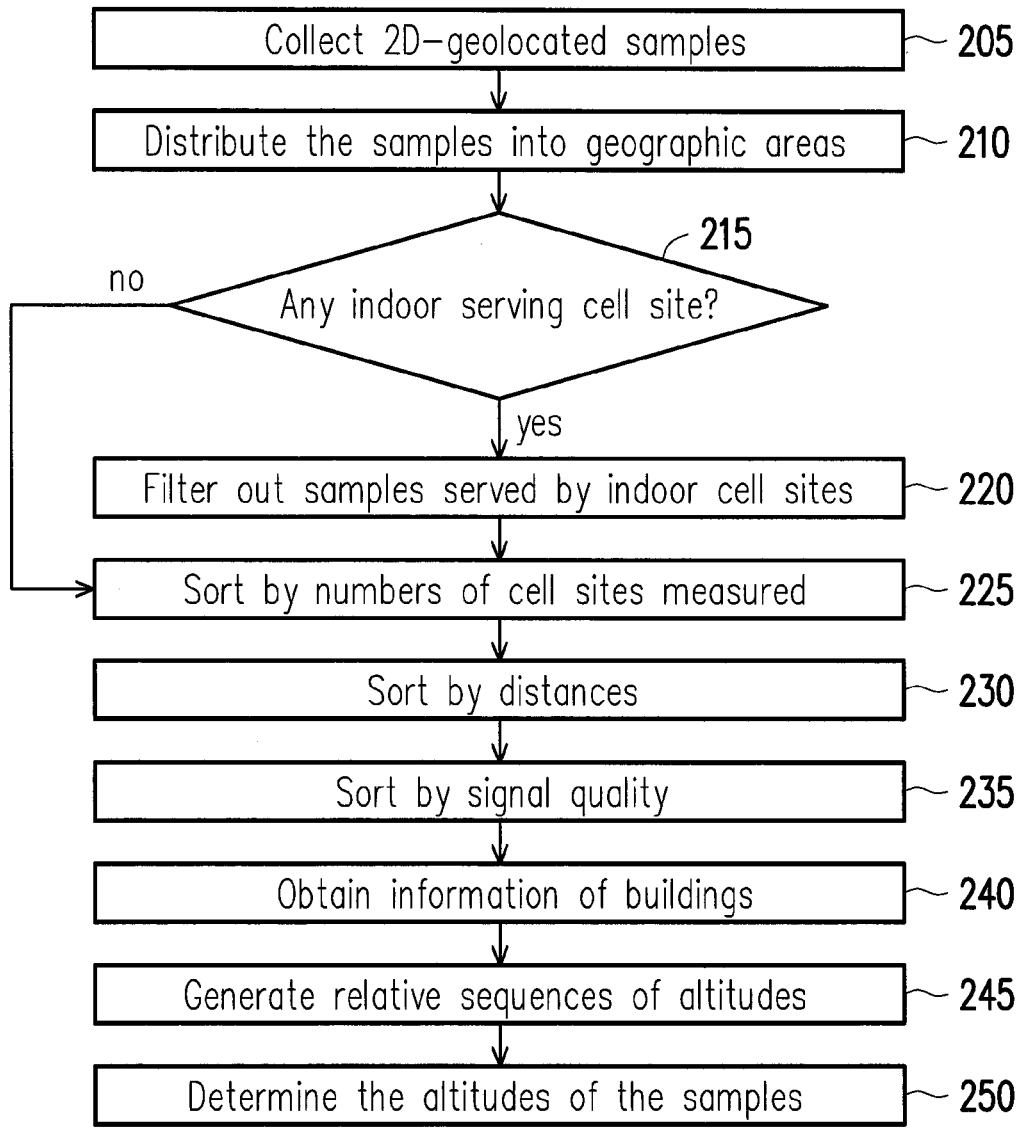

FIG. 2 is a flow chart showing the details of the 3D geolocation in step 145. The purpose of the 3D geolocation is determining the vertical altitudes of the indoor samples. The detailed steps of the 3D geolocation are explained below. In step 205, collect the indoor samples that are already 2D-geolocated in step 115 or step 125. In step 210, distribute the collected samples into a plurality of geographic areas according to 2D locations of the samples obtained by the 2D geolocation.

Figure 3:
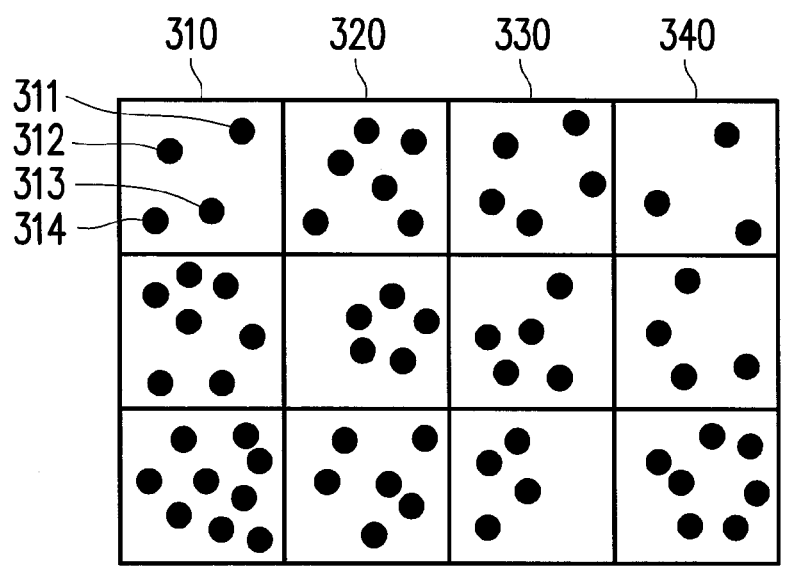
FIG. 3 is a schematic diagram showing geographic areas and samples according to an embodiment of the present invention.

FIG. 3 is a schematic diagram showing geographic areas and samples according to an embodiment of the present invention. Each grid in FIG. 3 is a geographic area. There are 12 geographic areas arranged into 3 rows. For example, the first row includes 4 geographic areas 310, 320, 330 and 340. Each geographic area may be an area of a preset size, such as 50 meters by 50 meters. Alternatively, the geographic areas may be defined according to a map of the city obtained from a geographic information system (GIS). In such a case, each geographic area may be a street block in the city map. The round dots in FIG. 3 are samples distributed into the geographic areas according to their 2D locations. For example, there are 4 samples 311-314 in the geographic area 310. In another embodiment of the present invention, the number of geographic areas may be smaller than 12 or larger than 12.

In step 215, check whether there are any samples served by indoor cell sites with known altitudes or not. The network topology provided by the operator of the mobile network includes the types (indoor or outdoor) of all of the cell sites of the mobile network. The network topology also includes the altitudes or the floor locations of the indoor cell sites in their corresponding buildings. Therefore, the indoor cell sites can be easily identified and their altitudes are already known.

If there are no samples served by indoor cell sites with known altitudes, the flow skips step 220 and proceeds to step 225. Otherwise, filter out the samples served by indoor cell sites with known altitudes in step 220. The known altitudes of the indoor cell sites are output as the altitudes of the filtered-out samples.

The following steps are for generating a relative sequence of altitudes of the samples in each geographic area. There is a corresponding relative sequence for each geographical area. The relative sequence of altitudes of the samples in a geographic area is generated according to altitude-related data obtained from the samples in the geographic area. The altitude-related data includes a plurality of types. The samples of each geographic area are sorted by each type of the altitude-related data individually. There are three types of altitude-related data that may be obtained from the measurement reports of the samples in this embodiment, namely, the number of cell sites measured by the user equipment corresponding to each sample, the distance between the user equipment corresponding to each sample and the cell sites measured by the user equipment, and the signal quality indicator of the cell sites measured by the user equipment corresponding to each sample. Therefore, there are three corresponding sorting steps 225, 230 and 235 in this embodiment.

In another embodiment of the present invention, there may be more than three types of altitude-related data or there may be less than three types of altitude-related data. Therefore, there may be more or less sorting steps in another embodiment.

In step 225, for each geographic area, sort the samples of the geographic area by the first type of the altitude-related data obtained from the samples of the geographic area, namely, the number of cell sites measured by the user equipment corresponding to each sample. Please note that the number of cell sites is different from the number of cells because a cell site may provide several cells. In general, the more the measured cell sites, the higher the altitude. The reason is that in higher places there are fewer obstacles for the measurement so that more cell sites can be measured. Therefore, in step 225 the samples may be sorted in ascending order.

In step 230, for each geographic area, sort the samples of the geographic area by the second type of the altitude-related data obtained from the samples of the geographic area, namely, the distance $D_R$ between the user equipment corresponding to each sample and the cell sites measured by the user equipment. There is a distance $D_I$ between the user equipment and each cell site measured by the user equipment. The distance $D_R$ may be the maximum distance among all of the distances $D_I$ or the average distance of all of the distances $D_I$. The distances $D_I$ may be obtained from the 2D geolocation in step 115 or 125. In general, the more the distance $D_R$, the higher the altitude. Therefore, in step 230 the samples may be sorted in ascending order.

In step 235, for each geographic area, sort the samples of the geographic area by the third type of the altitude-related data obtained from the samples of the geographic area, namely, the signal quality indicator $Q_R$ of the cell sites measured by the user equipment corresponding to each sample. There is a signal quality indicator $Q_I$ for each cell site measured by the user equipment. The signal quality indicator $Q_R$ may be the worst one among all of the signal quality indicators $Q_I$ or the average of all of the signal quality indicators $Q_I$. The signal quality indicators $Q_R$ and $Q_I$ may be RSSI (received signal strength indicator) in 2G mobile network, RSCP (received signal code power), Ec/Io or Ec/No in 3G mobile network, RSRP (reference signal received power) or RSRQ (reference signal received quality) in 4G mobile network, or any other equivalent indicator. In general, the smaller the signal quality indicator $Q_R$, the higher the altitude. The reason is that there are more cells that can be measured in higher places so that there are more interference between the cells. Therefore, in step 235 the samples may be sorted in descending order.

In step 240, for each geographic area, obtain related information of buildings in the geographic area from a GIS. The related information may include height, floor areas and types of the buildings. The aforementioned height is the height of the tallest building in the corresponding geographic area. The floor areas include the area of each floor of each building in the corresponding geographic area. The types include the type of each building in the corresponding geographic area, such as shopping mall building, school building or office building, etc.

In step 245, for each geographic area, generate a relative sequence of altitudes of the samples in the geographic area by combining the results of the sorting of each type of the altitude-related data of the geographic area. There are three types of altitude-related data in this embodiment and the three types correspond to the three sorting steps 225, 230 and 235. Therefore, for each geographic area in this embodiment, the relative sequence of the geographic area is generated by combining the results of the sorting of steps 225, 230 and 235. Any modeling technique, such as weighted equation, cluster weighted modeling, or rule based modeling, may be applied to combine the results of the sorting of steps 225, 230 and 235 to obtain the relative sequence. For each geographic area, the relative sequence is the relative order of the altitudes of the samples of the geographic area.

In step 250, for each geographic area, determine the altitudes of the samples in the geographic area according to the relative sequence of the geographic area and the height of the buildings of the geographic area. In general, people inside a building are distributed evenly on each floor of the building. The samples are generated by user equipments carried by people subscribing to the mobile network. Therefore, it is reasonable to assume that the samples are distributed evenly along the vertical height of the building. For each geographic area, the altitudes of the samples in the geographic area may be determined by distributing the altitudes of the samples in the geographic area evenly along the height of the buildings of the geographic area.

For example, assume the height of the buildings in a geographic area is 50 meters and the tallest building in the geographic area has ten floors. Assume that there are 200 samples in the geographic area. The altitudes of the 200 samples may be determined by distributing the 200 samples along the ten floors. The first 20 samples in the relative sequence are on the first floor and their altitudes are 0. The next 20 samples in the relative sequence are on the second floor and their altitudes are 5 meters. The next 20 samples in the relative sequence are on the third floor and their altitudes are 10 meters, and so on.

In another embodiment of the present invention, for each geographic area, the altitudes of the samples may be determined by distributing the altitudes of the samples in the geographic area along the height of the buildings of the geographic area according to floor areas and types of the buildings of the geographic area. The following Table 1 is an example of the distribution of the altitudes of the samples in a geographic area according to this embodiment.

TABLE 1

| Floor | $W_{XA}$ | $W_{XT}$ | $W_{YA}$ | $W_{YT}$ | $W_{ZA}$ | $W_{ZT}$ | $W_O$ | Samples |
|---|---|---|---|---|---|---|---|---|
| 1 | 3 | 1 | 2 | 2 | 1 | 3 | 10 | 100 |
| 2 | 3 | 1 | 2 | 2 | 1 | 3 | 10 | 100 |
| 3 | 3 | 1 | 1 | 2 | | | 5 | 50 |
| 4 | 2 | 1 | 1 | 2 | | | 4 | 40 |
| 5 | 1 | 1 | | | | | 1 | 10 |

There are three buildings X, Y and Z in the geographic area. Building X is an office building and has 5 floors. Building Y is a school building and has 4 floors. Building Z is a shopping mall and has 2 floors. Each floor of each building is associated with two weights. The weight $W_{XA}$ is associated with the floor areas of building X and the weight $W_{XT}$ is associated with the type of building X. The weight $W_{YA}$ is associated with the floor areas of building Y and the weight $W_{YT}$ is associated with the type of building Y. The weight $W_{ZA}$ is associated with the floor areas of building Z and the weight $W_{ZT}$ is associated with the type of building Z.

The weights $W_{XA}$ represent the ratios between the areas of the floors of building X. For each floor of building X, the weight $W_{XA}$ associated with the floor is directly proportional to the area of the floor. The same rule applies to buildings Y and Z as well.

In this embodiment it is assumed that, in general, the average number of people in each floor of a school building is twice as large as that in each floor of an office building. It is also assumed that, in general, the average number of people in each floor of a shopping mall is thrice as large as that in each floor of an office building. Therefore, ($W_{XT}$: $W_{YT}$:$W_{ZT}$)=(1:2:3).

There is an overall weight $W_O$ associated with each floor of buildings X, Y and Z. As shown in table 1, for each floor, $W_O=W_{XA}W_{XT}+W_{YA}W_{YT}+W_{ZA}W_{ZT}$.

The samples are distributed on the floors according to the overall weights $W_O$. The number of the samples on each floor is directly proportional to the overall weight $W_O$ associated with the same floor. Assume there are 300 samples in the geographic area. The number of the samples on each floor is shown in Table 1. Since the height of the tallest building X can be obtained from the GIS, the altitude of the samples on each floor in Table 1 can be determined according to the height of the building X.

The altitudes of the samples are obtained in step 220 or step 250. The latitudes and the longitudes of the samples are obtained in step 115 or step 125. The latitudes, longitudes and altitudes of the samples are the complete results of the 3D geolocation.

In another embodiment of the present invention, a recording medium storing a computer program is provided. The recording medium may be a physical non-transitory medium such as memory, floppy disc, hard disc or optical disc. An electronic device may execute the method of 3D geolocation shown in FIG. 1 and FIG. 2 when the electronic device loads and executes the computer program.

Figure 4:
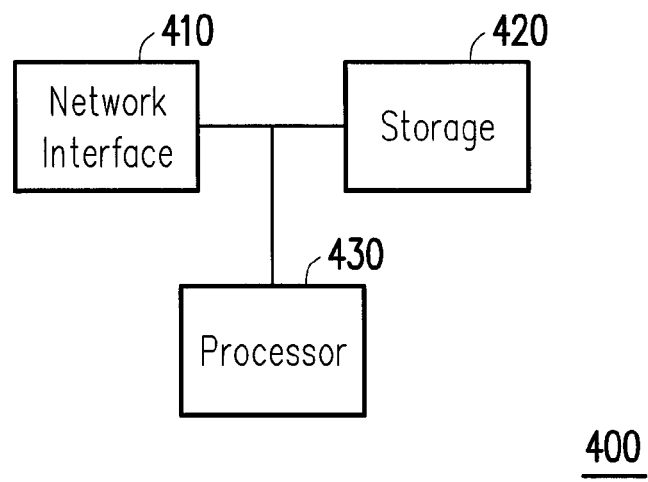
FIG. 4 is a schematic diagram showing an electronic device of 3D geolocation according to an embodiment of the present invention.

FIG. 4 is a schematic diagram showing an electronic device 400 of 3D geolocation according to an embodiment of the present invention. The electronic device 400 includes a network interface 410, a storage 420 and a processor 430 coupled to one another. The network interface 410 may receive the samples provided by the user equipments from the mobile network. The storage 420 may store the samples. The processor 430 may execute the method of 3D geolocation shown in FIG. 1 and FIG. 2 based on the samples stored in the storage 420.

In summary, the present invention provides a systematic approach to accurately geolocate the vertical dimension of subscribers in telecom mobile networks including 2G, 3G, 4G and 5G networks. In a mobile network, unlike GPS satellites measurement, usually a user equipment can hardly measure 4 or more cell sites. The present invention easily overcomes this limitation even when the measured cell sites are very limited. This is a breakthrough for the field of 3D positioning and geolocation. The method, recording medium and electronic device of 3D geolocation proposed in the present invention can be used in various applications, such as pinpointing the network problem down to vertical dimension, providing traffic offload strategy, recommending the location for cell site deployment in a building, minimizing effort, time and cost of in-building drive test, and analyzing life style of subscribers of mobile networks.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of 3D geolocation for geolocating a vertical dimension of subscribers connected to a telecom mobile network, performed by an electronic device comprising a processor and a storage, the method comprising:

receiving a plurality of samples, wherein each sample is provided by one of the subscribers, and each sample includes a measurement report having 2D location of the corresponding subscriber and signal information of nearby cell sites within the telecom mobile network;

distributing, by the processor, the samples that are already 2D-geolocated into a plurality of geographic areas according to 2D locations of the samples;

generating, by the processor, a relative sequence of the samples in term of altitude in each said geographic area according to the signal information of the nearby cell sites of the samples, wherein the relative sequence is a relative order of the altitudes of the samples in each said geographic area;

determining, by the processor, altitude of each said sample in each said geographic area according to the relative sequence of the samples in each said geographic area; and outputting, by the processor, the altitudes of the samples in each said geographic area, wherein the signal information of the nearby cell sites includes at least one of a number of cell sites measured by each said subscriber, a distance between each said subscriber and the cell sites measured by the subscriber, and a signal quality indicator of the cell sites measured by each said subscriber, wherein the step of generating, by the processor, the relative sequence of the samples in term of altitude in each said geographic area according to the signal information of the nearby cell sites of the samples includes:

sorting, by the processor, the samples in each said geographic area according to the number of measured cell sites to generate a first sorted result;

sorting the samples in each said geographic according to the distance between each said subscriber and the measured cell sites to generate a second sorted result;

sorting the samples in each said geographic area according to the signal quality indicator of the measured cell sites to generate a third sorted result; and generating, by the processor, the relative sequence of the samples in each said geographic area in term of altitude by combining the first, second and third sorted results.

2. The method of claim 1, further including:

before generating the relative sequences, filtering out, by the processor, the samples served by indoor cell sites with known altitudes.

3. The method of claim 2, further including:

outputting, by the processor, the known altitudes of the indoor cell sites as the altitudes of the filtered-out samples.

4. The method of claim 1, further including:

determining, by the processor, the altitudes of the samples in each said geographic area according to the relative sequence of the geographic area and a height of buildings of the geographic area.

5. The method of claim 4, wherein the step of determining the altitudes of the samples includes:

distributing, by the processor, the altitudes of the samples in each said geographic area along the height of the buildings of the geographic area.

6. The method of claim 5, wherein the step of distributing the altitudes of the samples in each said geographic area includes:

distributing, by the processor, the altitudes of the samples in the geographic area along the height of the buildings of the geographic area according to floor areas and types of the buildings of the geographic area.

7. The method of claim 6, further including:
obtaining, by the processor, the height, the floor areas and the types of the buildings of each said geographic area from a geographic information system.

8. A non-transitory recording medium storing a computer program, wherein an electronic device executes the method of claim 1 when the electronic device loads and executes the computer program.

9. An electronic device of 3D geolocation for geolocating a vertical dimension of subscribers connected to a telecom mobile network, comprising:
a network interface, receiving a plurality of samples, wherein each sample is provided by one of the subscribers, and each sample includes a measurement report having 2D location of the corresponding subscriber and signal information of nearby cell sites within the telecom mobile network;
a storage, storing the plurality of samples that are already 2D-geolocated; and
a processor, coupled to the storage, distributing the samples that are already 2D-geolocated into a plurality of geographic areas according to 2D locations of the samples,
generating a relative sequence of the samples in term of altitude in each said geographic area according to the signal information of the nearby cell sites of the samples, wherein the relative sequence is a relative order of the altitudes of the samples in each said geographic area,
determining altitude of each said sample in each said geographic area according to the relative sequence of the samples in each said geographic area,
and outputting the altitudes of the samples in each said geographic area,
wherein the signal information of the nearby cell sites includes at least one of a number of cell sites measured by each said subscriber, a distance between each said subscriber and the cell sites measured by the subscriber, and a signal quality indicator of the cell sites measured by each said subscriber, wherein in the operation of generating the relative sequence of the samples in term of altitude in each said geographic area according to the signal information of the nearby cell sites of the samples,
the processor sorts the samples in each said geographic area according to the number of measured cell sites to generate a first sorted result,
the processor sorts the samples in each said geographic according to the distance between each said subscriber and the measured cell sites to generate a second sorted result,
the processor sorts the samples in each said geographic area according to the signal quality indicator of the measured cell sites to generate a third sorted result,
and the processor generates the relative sequence of the samples in each said geographic area in term of altitude by combining the first, second and third sorted results.

10. The electronic device of claim 9, wherein before generating the relative sequences, the processor filters out the samples served by indoor cell sites with known altitudes.

11. The electronic device of claim 10, wherein the processor outputs the known altitudes of the indoor cell sites as the altitudes of the filtered-out samples.

12. The electronic device of claim 9, wherein the processor determines the altitudes of the samples in each said geographic area according to the relative sequence of the geographic area and a height of buildings of the geographic area.

13. The electronic device of claim 12, wherein for determining the altitudes of the samples, the processor distributes the altitudes of the samples in each said geographic area along the height of the buildings of the geographic area.

14. The electronic device of claim 13, wherein the processor distributes the altitudes of the samples in each said geographic area along the height of the buildings of the geographic area according to floor areas and types of the buildings of the geographic area.

15. The electronic device of claim 14, wherein the processor obtains the height, the floor areas and the types of the buildings of each said geographic area from a geographic information system.

* * * * *